United States Patent [19]
Platzker et al.

[11] Patent Number: 5,528,263
[45] Date of Patent: Jun. 18, 1996

[54] INTERACTIVE PROJECTED VIDEO IMAGE DISPLAY SYSTEM

[75] Inventors: Daniel M. Platzker, 12281 Country Squire La., Saratoga, Calif. 95070; Yoav Agmon, Los Altos; Rueven Ackner, Palo Alto, both of Calif.

[73] Assignee: Daniel M. Platzker, Saratoga, Calif.

[21] Appl. No.: 259,887

[22] Filed: Jun. 15, 1994

[51] Int. Cl.⁶ .................................................. G09G 5/00
[52] U.S. Cl. ............................................ 345/156; 345/179
[58] Field of Search .................................. 345/145, 146, 345/156, 157, 173, 175, 179; 348/14, 18, 61, 552

[56] References Cited

U.S. PATENT DOCUMENTS

| | | | |
|---|---|---|---|
| 4,430,526 | 2/1984 | Brown et al. | 345/157 |
| 5,138,304 | 8/1992 | Bronson. | |
| 5,181,015 | 1/1993 | Marshall et al. | |
| 5,239,373 | 8/1993 | Tang et al. | 345/179 |
| 5,436,639 | 7/1995 | Arai et al. | 345/175 |

Primary Examiner—Jeffery Brier
Attorney, Agent, or Firm—Feix & Feix

[57] ABSTRACT

An interactive projected image video display system which includes a computer for generating video images, a projection apparatus coupled to the video output port of the computer for projecting computer-generated video images onto a projection screen, and at least one video camera for visually recording the projected image. The computer includes a frame grabber board coupled to the video camera for capturing individual frames or series of frames from the video recording of projected image. The captured images are compared to the computer generated images to detect for the presence of recognizable features introduced onto the projected image by a user to instruct the computer to trigger a computer operation. The system can also simulates a mouse to be used with any off the shelf application that uses a regular mouse.

22 Claims, 5 Drawing Sheets

MODE 1: CLICKING A BUTTON

Fig_3A

Fig_3B

Fig_3C

MODE 2: GENERAL POINTING/POSITIONING

Fig_4

Fig_5A

Fig_5B

Fig_6A

Fig_6B

INTERACTIVE PROJECTED VIDEO IMAGE DISPLAY SYSTEM

BACKGROUND OF THE INVENTION

1. Field of the Invention

The present invention relates generally to projected video image display systems. More particularly, the invention relates to a computer-based projected video system and method of providing interaction directly with a projected video image without the need for an active computer input device.

2. Description of the Prior Art

Projected video image display systems of the kind which use a computer for generating a video image and a projection device for projecting the computer-generated video image onto an enlarged screen are becoming popular for use in making presentations to a group of people in a small to medium size conference room environment. In such projected video display systems, it is desirable for a user standing next to the projection screen (located a distance away from the computer) to be able to enter information interactively into the computer for modifying or generating new images during the presentation.

The conventional way to provide interaction with a computer requires use of an "active" element or computer input device to provide cursor movement control. Examples of common computer input devices include absolute positioning devices, such as light pens and digitizing tablets; and also relative positioning devices, such as joy sticks, mouse devices, and track balls. Such active input devices, however, are usually too limiting for effective use in projected video image display systems. For example, absolute positioning devices, such as conventional light pens, require the user to interact directly with the video screen display of the monitor associated with the computer. This disrupts the spontaneity of the presentation as the user must repeatedly go back and forth between the computer monitor and the projection screen when the user desires to change the computer generated video image. In the case of relative positioning devices, such as track balls or mouse devices, the user must be skillful in manipulating the track ball or mouse in space. This can be awkward and usually requires use of both hands (i.e. one hand to hold the track ball or mouse pad in space and the other hand to manipulate the track ball or mouse to move the cursor). Such two handed operation also disrupts the natural flow of the presentation.

Projected video image display systems which use a hand held light pen for enabling a user to shine a high intensity light directly onto a projection screen bearing a computer generated image to provide auxiliary information to a computer are known from the prior art. In such prior art systems, an optical sensing device is used for detecting the high intensity light aimed at the projected image on the screen. Signal processing apparatus are used for discriminating the changes in reflected light on the projected images from the computer generated images in order to input information interactively into the computer. Exemplary systems are disclosed in U.S. Pat. No. 5,138,304, issued to Barry Bronson, and U.S. Pat. No. 5,181,015, issued to Roger L. Marshall et al.

A disadvantage with the above described known systems, however, is that the optical sensing device and related signal processing apparatus are typically of special purpose design and therefore expensive. Also, the requirement of the active input device, i.e. the light pen, is also disadvantageous as the light pen can be easily misplaced or dropped or damaged during a presentation or the batteries can die off.

It would be desirable to provide a more natural and unobtrusive way for enabling a user to interact with a computer of a projected video image display system in order to modify the projected image. It would also be desirable to provide a projected video image display system that does not require an active input device, such as a light pen, mouse device, track ball, etc., for inputting changes to a computer. In particular, it would be desirable to provide an interactive projected video image display system which would optically recognize a particular feature or a pattern created by the combination of the projected video image and an object introduced onto the projected image by the user in order to trigger a desired computer operation. Finally, it would also be desireable to provide such an interactive projected video display system which obviates the need for special use and expensive optical sensing components and related signal processing apparatus.

SUMMARY OF THE INVENTION

Methods and apparatus which incorporate the desired features described above and which are effective to function to overcome the shortcomings of the prior art as described above constitute specific objects of this invention.

The present invention provides an interactive projected image video display system which includes a computer for generating video images, a projection apparatus coupled to the video output port of the computer for projecting computer-generated video images onto a projection screen, and an optical recording device such as a conventional video camera, aimed at the projection surface for visually recording the projected image. The computer includes a frame grabber board or like image capturing means coupled to the video camera for capturing individual frames or series of frames from the video recording of the projected image. The captured images are then compared to the computer generated images to detect for the presence of an object having a particular feature or a recognized pattern/feature created by the combination of the introduced object and the video image. The detected object indicates an instruction to the computer, such as, for example, to modify the video image.

The object is introduced onto the projected image by a user during a presentation. The object may include any convenient pointing element having a recognizable feature, such as for example, a user's hand or fingers held in a particular orientation or angle, a pointer, a pen, etc. The means for detecting the pointing element and activating the computer to perform certain tasks is preferably embodied in a software program written in accordance with known image processing algorithms and techniques.

In a first mode of operation, the user may simulate "clicking" a button contained in the projected image. The button contains an instruction for signalling the computer to perform a certain task, such as, for example, advance to the next image, save an image to memory, etc. In this mode, the location of the button is predetermined and known to the computer. The user places the pointing element over the button on the projected image. During this time, the video camera is recording this activity.

In accordance with the feature detection process, the frame grabber will grab a single frame containing the button and pointer. A search of a block region on the grabbed image corresponding to the button location is then made. Upon detection of the pointing element, an activation signal is generated and the computer will execute the instruction corresponding to the selected button.

In a simple application of the first mode of operation, a grey scale comparison technique is used to check the amount of shadowing present in the projected button by comparison with other portions of the projection surface where the light intensity is known or by comparison with the level of shadowing previously measured at the same button region. In this case, the user may "click" the projected button by simply holding his or her hand or some other object to block or cover the projected button for a predetermined length of time.

In a more advanced application of the first mode of operation, the computer may be programmed in accordance with more advanced image processing techniques, such as feature extraction or pattern correlation, in order to look for special patterns or pattern changes present in the captured image as compared with the projected image. Such special patterns may include, for example, a cross formed by a pen being laid over a projected line contained in a projected button. The computer may also be programmed to look for other special features such as profile, size, color, etc., or special movements of the introduced object, such as, for example, a hand movement corresponding to making a check mark.

In a second mode of operation, the user may simulate marking points on the projected video image. In this mode, the desired mark locations are not already known to the computer. The user marks the location by pointing using a pointing element or pointer (having a pattern or posture recognizable by the computer). In a preferred embodiment of the invention, the user marks the points by touching the projected screen. The touching of a pointing element or pointer (having a pattern or feature recognizable by the computer) to the projection screen can be verified again by using known grey scale comparison techniques in order to detect when the pointer meets its own shadow. Alternatively, a second video camera oriented at a side angle relative to the projection screen may be used to verify that the pointer actually touches the surface of the projection screen.

In a more advanced application of the second mode of operation the pointing element is used in combination with the projected video to generate a predetermined feature for marking points on the image. For example, the projected video image may include a series of equally spaced vertical lines that cover the whole image. The user marks a point by generating a recognizable cross pattern by holding the pointing element over one of the vertical lines. More advanced features can be generated by combining more sophisticated patterns into the video image.

In a further application of the second mode of operation, the user may use the pointer as a video cursor control means just like a mouse pointing device or light pen in order to enter hand written text or draw lines, curves or other graphical objects directly on the projected image.

As another application of the second mode of operation, it is possible to implement a full simulation of a mouse that works with any off the shelf application that uses a regular mouse as an inputting device.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DETAILED DESCRIPTION OF THE BEST MODE OF THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Figure 1:
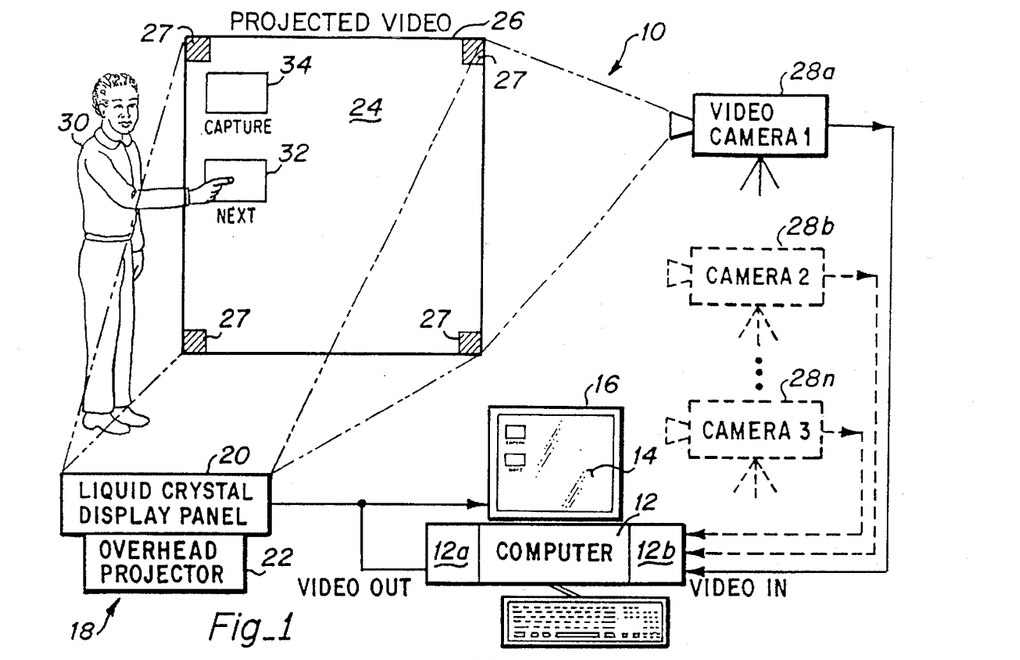
FIG. 1 is a diagrammatic view of an interactive projected video image display system in accordance with one embodiment of the present invention.

FIG. 1 shows a generalized diagrammatic view of a projected image video display system 10 in accordance with one embodiment of the present invention.

The system 10 includes a computer 12 for generating and displaying a video on monitor 16 (optional). As is conventional, the monitor 16 is coupled to the video output port 12a of the computer 12. Also coupled to the video output port 12a is an apparatus 18 for providing an enlarged projection of the video image generated by the computer 12. In a preferred embodiment, the apparatus 18 includes a conventional liquid crystal display (LCD) panel 20 and an overhead projector 22. The LCD panel 20 receives video image signal input from the computer 12 and generates light images which, in turn, are projected by the overhead projector 22 as a projected image 24 on a viewing surface, such as projection screen 26. The projection screen 26 may be any flat, and preferably light colored surface such as, for example, the ubiquitous white board found in most office conference rooms. In the example shown, two projected buttons 32, 34 are contained in the projected image 24.

While, the apparatus 18 is described as including a separate LCD panel 20 and overhead projector 22, it is understood that single machines capable of receiving and projecting video image data are becoming available and may be advantageously used in the present invention.

The system 10 further includes an optical sensing device, such as video camera 28a, for visually recording the projected image 24. The video camera 28a is coupled to the video input port 12b of the computer 12. The video input port 12b computer includes a conventional frame grabber board or equivalent image capturing means for selectively grabbing individual frames or groups of frames of the projected image as recorded by the video camera 28a. One or more additional video cameras, indicated generally at 28b, . . . , 28n, may be included for providing enhanced feature detection capability to the system 10. This is discussed in more detail below with reference to the second mode of operation.

The computer 12 is programmed to compare the captured images with the original video image. Upon detection of certain recognized objects having a particular feature which are present in the captured image or upon detection of a recognizable pattern which has been formed by the combination of an introduced object and an existing feature contained in the projected image, a signal is generated to activate the computer to perform a specific instruction, such as for example, modify the video image, save a captured image to memory, etc.

Figure 2:
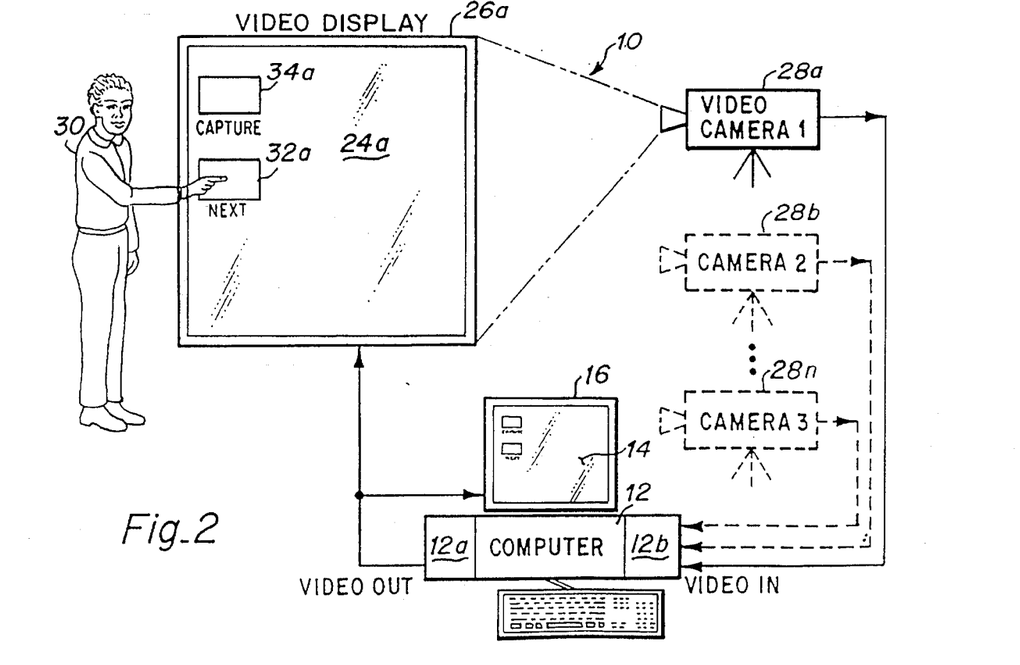
FIG. 2 is a diagrammatic view of a system similar to FIG. 1 in accordance with a second embodiment of the present invention.

FIG. 2 shows an alternate embodiment for the system 10 of the present invention. The system components common to both the first embodiment of FIG. 1 and the second embodiment of FIG. 2 are indicated by the same reference numerals. The second embodiment of FIG. 2 differs from the first embodiment of FIG. 1 in that video image 14 is not projected but instead is presented as an enlarged displayed image 24a on large screen video display 26a. The large screen video display 26a is coupled directly to the video output port 12a of the computer 12. In this example, two displayed buttons 32a, 34a are contained in the displayed image 24a.

As noted above, the preferred optical sensing device includes at least one video camera 28a which provides a continuous visual recording of the projected or displayed video image. However, it is understood that other optical sensing devices such as, for example, a charged coupled device (CCD) image sensor or camera may be used in place of the video camera with equally good results. As will be readily appreciated by those having ordinary skill in the art, appropriate signal processing apparatus or software may be coupled with a CCD image sensor or camera to convert the recorded images in a form usable by the computer for image comparison with the original known video-generated images.

The method and apparatus for providing interaction directly with a computer generated projected image and thereby simulating a video version of a computer input device will now be explained with reference to two example operational modes of the system 10.

MODE ONE: SELECTING (CLICKING) A BUTTON

With reference to FIGS. 1, 2, and 3A–3C, a first mode of operation for selecting or "clicking" a button contained in the projected or displayed image will be described. The projected image (FIG. 1) or displayed image (FIG. 2) contains "instructions" for the user. These "instructions" are associated with the projected or displayed buttons contained in the projected or displayed image, respectively. The user may simulate a mouse click by merely touching or placing an object, such as a pointer, over the desired projected or displayed button.

With reference to the generalized flow chart of FIG. 3C, the process for clicking a single button will be described. During a presentation, the user inputs information onto the projected or displayed image by either writing information or effecting changes by selecting a desired button. All during this time, the video camera 28a continuous records these changes. The frame grabber grabs a single frame of the video recording (step 40). Next, the computer reads (at step 42) a block region of the frame grabbed by the frame grabber corresponding to the location of a first button. This block region has a location which is known to the computer. Next, the block region is checked (step 44) for the presence of a an object having a particular feature or a recognizable pattern. If (at step 46) the object or recognized pattern is found in the block, the computer executes a specified control function associated with the selected button (step 50). If there is no match or if the object or pattern does not exist, then no computer operation is triggered. The above process is repeated for each grabbed frame.

For the case where two or more buttons are contained in the projected or displayed image. Process steps 42–46 are repeated until all the blocks corresponding to all the button locations in the projected or displayed image are checked for recognizable patterns before advancing to the next grabbed frame.

The feature or recognition algorithm may use any one of many well known algorithms including but not limited to binary methods, gray scale methods, etc. As will be appreciated by those having ordinary skill in the art, the particular method chosen will depend in large part on the type of pattern or feature to be recognized.

The image discrimination is preferably implemented in software in the form of a pattern correlation or feature extraction algorithm. Techniques for detecting features in digital images are well-known in the art. Exemplary references which disclose such techniques include: *Digital Picture Processing*, Azriel Rosenfeld and Avinash Kak, Vol. II, 2nd edition, Academic Press, 1982; *Digital Image Processing*, Rafael C. Gonzales, Richard E. Woods, Addison-Wesley Publishing Co., 1992; and *Computer Vision*, Dana H. Ballard, Christopher M. Brown, Prentice-Hall, 1982.

Figures 3A, 3B, 3C:
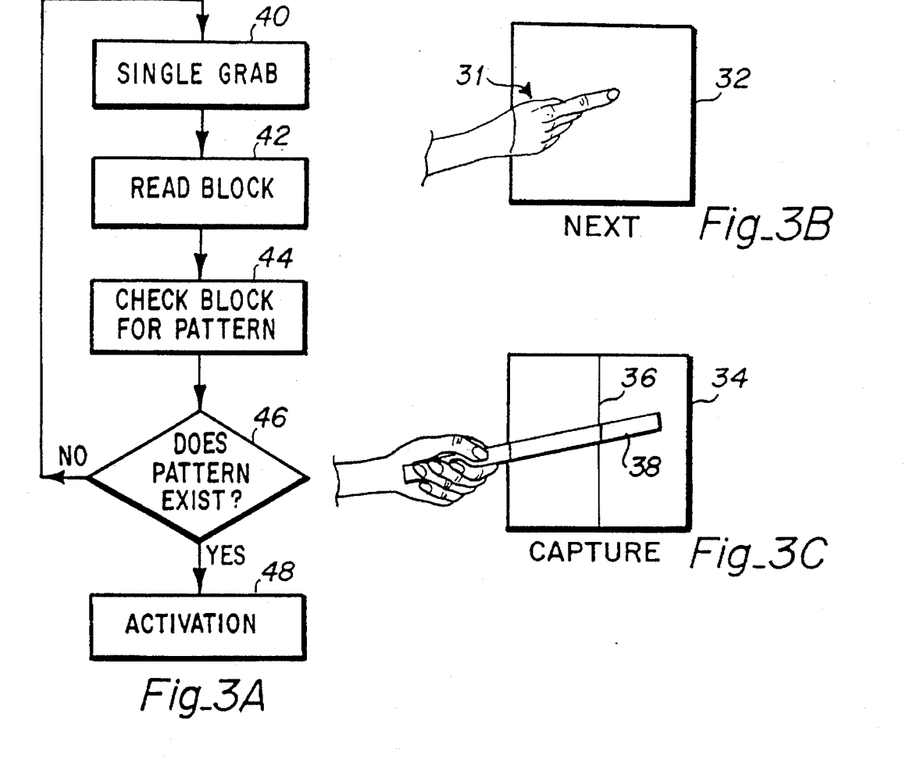
FIG. 3A is a flow chart which describes and shows the process of clicking a button for initiating a modification of the projected video image.
FIG. 3B is an enlarged diagrammatic view of a projected button contained in a projected video image and which shows an object having a particular feature (in this case a user's hand) being introduced over the projected button.
FIG. 3C is a schematic view of a projected button similar to FIG. 3B except in this case the projected button includes a projected vertical line and the object having a particular feature is a pointer.

FIGS. 3B–3C show examples of objects having a particular feature being introduced over a projected button 32. In FIG. 3B, the button 32 represents the instruction "next". In operation, the user 30 introduces his or her hand 31 (or other recognized pointing element) over the button 32 to simulate clicking the button 32 to generate a new video image 14.

In FIG. 3C, the projected button 34 contains a projected vertical line 36. The user introduces a pointer such as a ruler 38 onto the button to form a cross. The cross represents a special pattern recognizable by the computer for carrying out a desired instruction. In the example given, the instruction "capture" signals the computer to save the captured image in a file in the memory of the computer.

Preferably, only those portions of the captured image which contain new or updated information are saved to memory. In other words, in accordance with an advantageous aspect of the invention, it is now possible to store just the difference between the capture image and the projected image. This is done to conserve memory space since graphic files are typically memory intensive. The captured image may be recalled at a later time to reappear as the projected image. Alternately, several captured images which have been stored in memory may be recalled at once, each superimposed upon the other, to provide a multi-layering effect. Such a multi-layering feature is particularly advantageous when used in combination with a projection screen in the form of a white board whereby one or more users may draw on the board with erasable ink markers of different colors. In this way, several versions of the projected image containing different changes in erasable ink can be captured, saved to memory, and then recalled for subsequent multi-layering onto each other to provide a readily understandable visual chronology of changes throughout the projected video presentation.

MODE TWO: GENERAL POINTING AND POSITIONING

Figure 4:
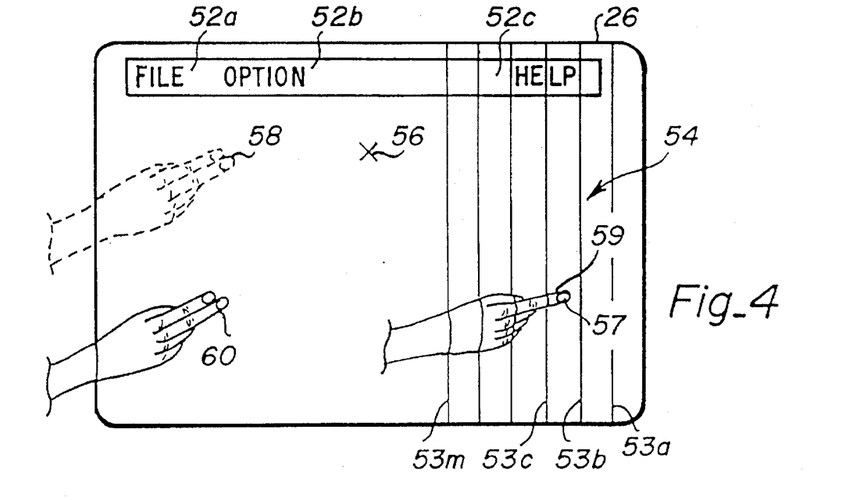
FIG. 4 is a schematic view of a projected video image of a menu window which illustrates the general pointing and positioning mode of operation of the present invention.

FIG. 4 illustrates the general pointing and positioning mode of operation of the invention. In this example, the projected image 24 includes a menu bar 50 containing menu items 52a, 52b, . . . , 52n and a general positioning and pointing field 54. In this mode, the computer searches the entire grabbed image to detect the presence of an object anywhere on the image.

If the object is detected over one of the menu items 52a, 52b, . . . , 52n, the computer will perform the task associated with the selected menu item in accordance with the first mode of operation described above. If the object is detected in the general positioning and pointing field, the computer will generate a point or position a cursor at the location corresponding to where the user has placed the object. In the example shown, the computer is looking for an object in the form of two fingers 60 extended in the pointing position. In this case, two marks 56, 58 have been generated at locations on the projected image where the user's two fingers 60 have been placed.

The process of marking a point in the general positioning can be implemented by programming the computer to look for a special feature or features that are generated by the combination of the pointing element and the projected image. For example, as seen in FIG. 4, the projected image may be provided with equally spaced vertical lines 53a–53m. The user can then quickly mark point at 59 by placing his or her finger 57 over the vertical line 53c to form a cross shape. The cross shape is readily recognizable by the computer using only a minimum of processing for detection of this simple pattern. The computer can be programmed to look for and recognize a more advanced feature or features by including a more sophisticated pattern in the video image.

In a further application of the second mode of operation, the above described feature recognition process may be implemented in a front end application program to simulate a mouse for accessing information from other currently running programs and for moving around within the different applications on the screen. Such application is possible in every computer with an operating system that support a mouse or a pen-like type interface. An example of such operating system is WINDOWS™ (WINDOWS™ is a trademark of Microsoft Corporation). This may be done, for example, by including within the front end application program, a mouse driver written in software, which will provide a series of pop up menu windows containing user selectable command items corresponding to basic mouse operations. The selection of a desired command item for carrying out a particular mouse operation may be done by placing a "recognized" object (e.g. a pointer, the user's hand or fingers held in a particular way, etc.) over the desired command item displayed in the pop up menu window in the projected image in accordance with the feature recognition process as described earlier.

The mouse driver of the present invention preferably simulates the following four basic operations of a mouse that are common to most conventional mouse drivers:

(1) "Mouse_Down" corresponding to the depression of a mouse button;

(2) "Mouse_Up" corresponding to the release of a mouse button;

(3) "Double_Click" corresponding to where a mouse button has been depressed and released twice; and (4) "Mouse_Move" corresponding to the movement of a mouse to a new location.

In accordance with conventional cursor control techniques, the mouse driver will send a message to the operating system indicating that a particular event has occurred when a command item corresponding to the mouse operation associated with that event has been selected from the associated pop up menu window. In addition, the (x,y) coordinates of the mouse at the time the event occurred will also be sent to the operating system. A single click of the mouse is performed as a combination of "Mouse_Down" and "Mouse_Up" operations without moving the mouse. In this way, the user may simply select the desired mouse operation to simulate a single mouse click, a double mouse click, dragging the mouse, etc., in order to perform the desired function of the currently operating program, such as, for example, clicking, drawing a line, drawing a curve, drag and drop, etc.

Figure 5A:
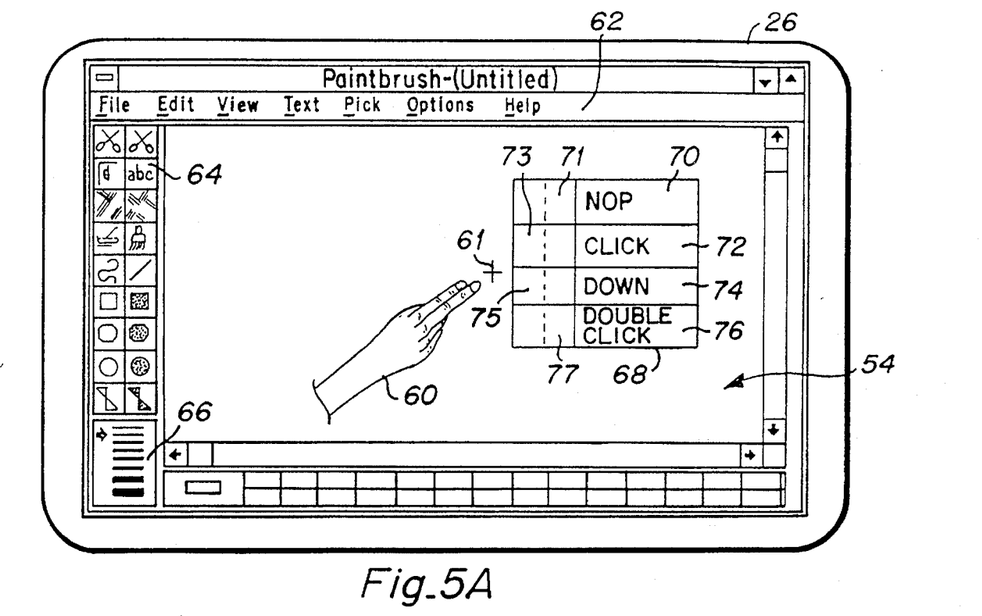
FIG. 5A diagrammatically shows a projected video image with a first pop up menu window activated and which contains a list of user selectable command items for performing conventional mouse operations.
Figure 5B:
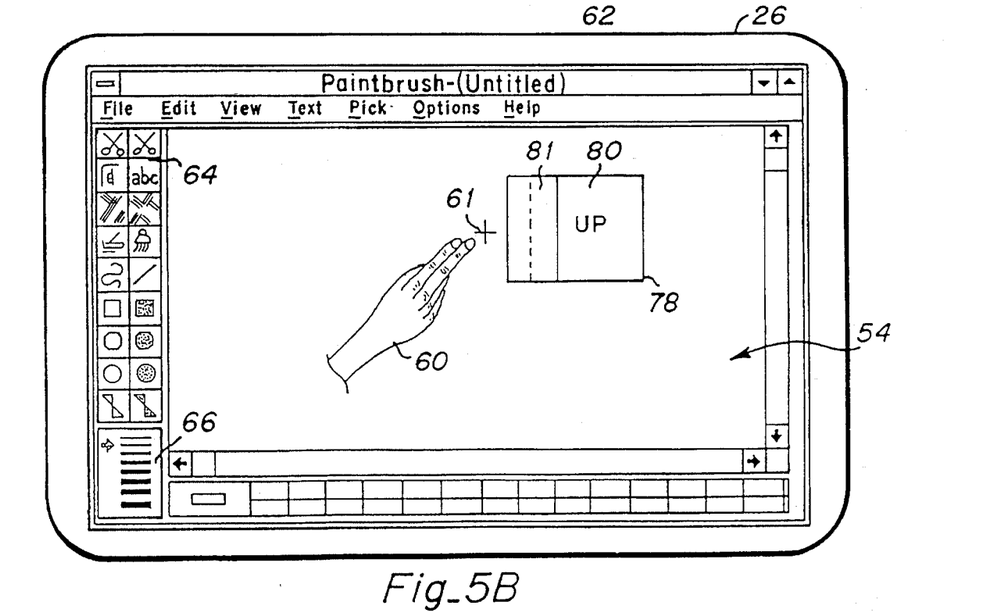
FIG. 5B diagrammatically shows a projected video image with a second pop up menu window activated which contains a single user selectable command item for ending mouse operation.

FIGS. 5A–5B illustrate, by way of example, a projected image 26 which depicts a screen display associated with a WINDOWS™ Paintbrush program. In the example shown, the projected image 26 is displaying the main Paintbrush window and shows the items in the main Paintbrush window including the top menu bar 62 (having command items such as "File", "Edit", etc.) the tool box 64, and the linesize box 66.

Figure 6A:
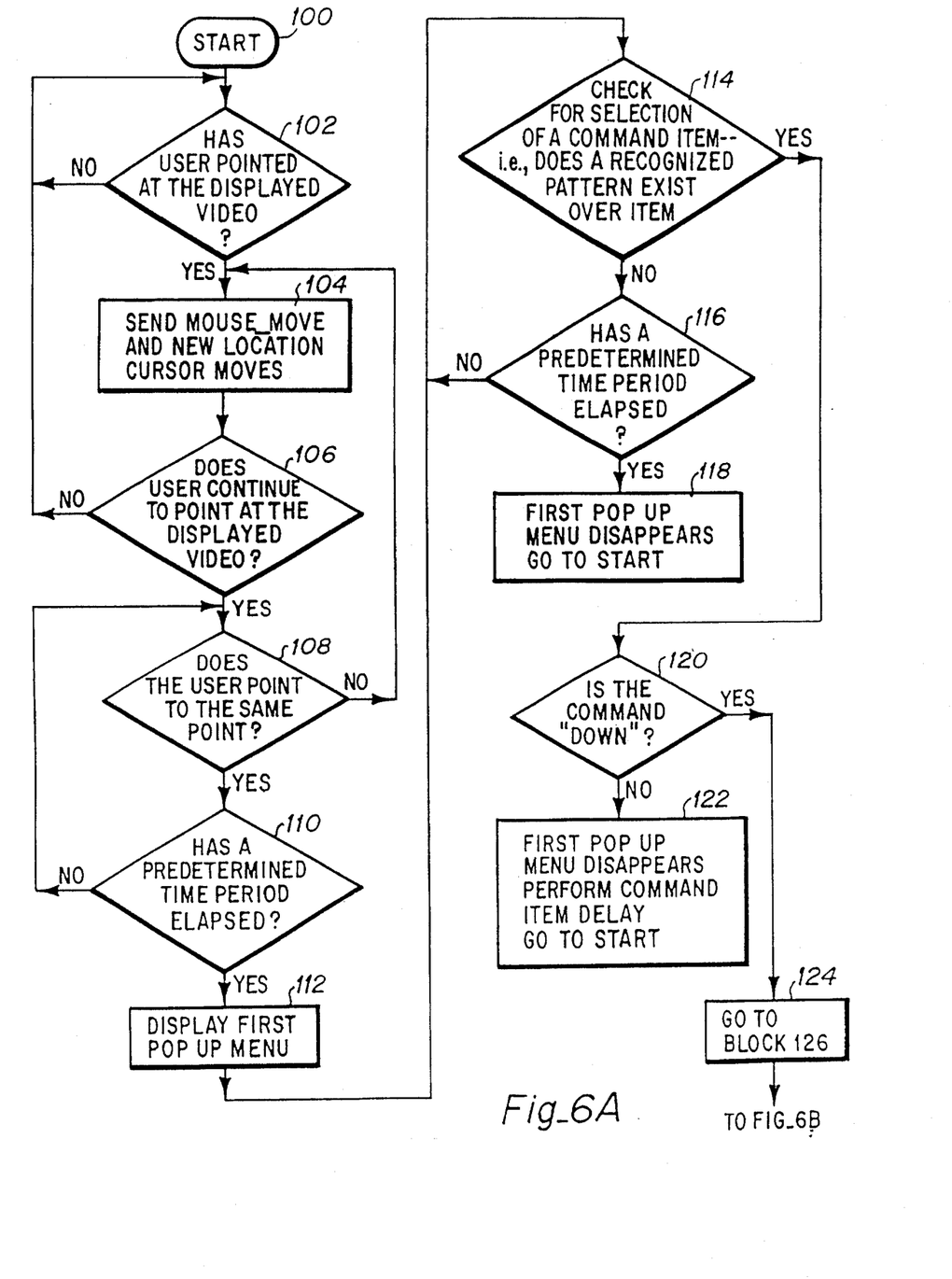
FIGS. 6A–6B is a two part series depecting a flow chart which describes and shows the process for simulating video mouse operation on a projected video image.

The process of the video mouse driver of the invention will be described in conjunction with FIG. 6a–6b, which show, in flow chart form, the steps of the video mouse driver as it relates to a currently running WINDOWS™ application program. It is understood that the process of the invention is not limited to just WINDOWS™ type applications but may also be implemented in any application which supports a mouse, a pen or like computer input device.

The video mouse driver starts (step 100) when a video image generated by the computer 12 is projected by apparatus 18 onto projection surface or screen 26 (see e.g. FIG. 1). The computer then determines (in step 102) whether the user has pointed at the projected image.

This is done using the feature/pattern detection process as previously described.

When the driver detects that the user has pointed at the screen it sends WINDOWS™ (in step 104) the Mouse_Move message along with the coordinates of the new point. WINDOWS™ reacts by moving the cursor 61 of the application. The exact shape of the cursor depends on the specific application.

The driver then checks (in step 106) whether the user continues to point at the projected or displayed video image.

If the answer is negative the program returns to its starting point (step 100). If the answer is positive, i.e., the user is still pointing at the projected or displayed video image, the driver checks (in step 108) whether the user has moved the pointer. If the user points at a different place, the program returns to step 104 to update the location of the cursor. If the user keeps pointing at the same location for a predetermined period of time, e.g., 2 seconds (step 110), then a first pop up menu window 68 is projected or displayed adjacent to the cursor position 61 (step 112).

The first pop up menu 68 contains the four command items: NOP 70 (which stands for "no operation"), CLICK 72, DOWN 74, and DOUBLE CLICK 76. Adjacent each command item 70, 72, 74, and 76 is a respective selection button 71, 73, 75, and 77. As before, the buttons may be selected by the recognized feature/pattern detection process as described above with reference to FIGS. 3B–3C and 4.

The computer then checks (in step 114) for a selection of command item contained in the first pop up window 68 allowing the user to make such a selection within a predetermined period of time, e.g., 2 seconds (step 116). If no selection is made during the predetermined period of time, the first pop up menu 68 disappears and the program returns to its starting point. If a selection is made, the selected command item is performed.

The driver discriminates between two types of selections (step 120). The first selection is the command DOWN, which requires special processing shown in FIG. 6B. The second selection is for the commands NOP, CLICK, and DOUBLE CLICK. For the latter selection (step 122), the first pop up menu 68 disappears, the driver executes the command item by sending an appropriate message to the operating system, and the program returns to it starting point (step 100) after a small delay (e.g. 2 seconds). The small delay is necessary in order to allow the user enough time to move the pointer to a new desired location.

The process by which the driver executes the command in the menu depends on the specific command. For example, to simulate a single mouse click, the user will select button 73 corresponding to the CLICK command item 72. In this case the mouse driver sends to the operating system the messages the "Mouse_Down" followed by "Mouse_Up", which the WINDOWS™ recognizes as a mouse click. In addition, the mouse driver, sends the (x,y) coordinates of the point in order to update the cursor location. The click triggers an event that will depend on the particular application being run at the time, e.g., drawing a curve.

To stimulate a double mouse click, the user will select button 77 corresponding to the DOUBLE CLICK command item 76. This action signals the mouse driver to send to WINDOWS™ the four messages "Mouse_Down", "Mouse_Up", "Mouse_Down" and "Mouse_Up" within a predetermined time frame.

The user also has the option of selecting button 71 corresponding to the NOP (no operation) command item 70. This will make the first pop up window 68 disappears without affecting the cursor location, and causes the driver to go back to the starting point (step 100).

Figure 6B:
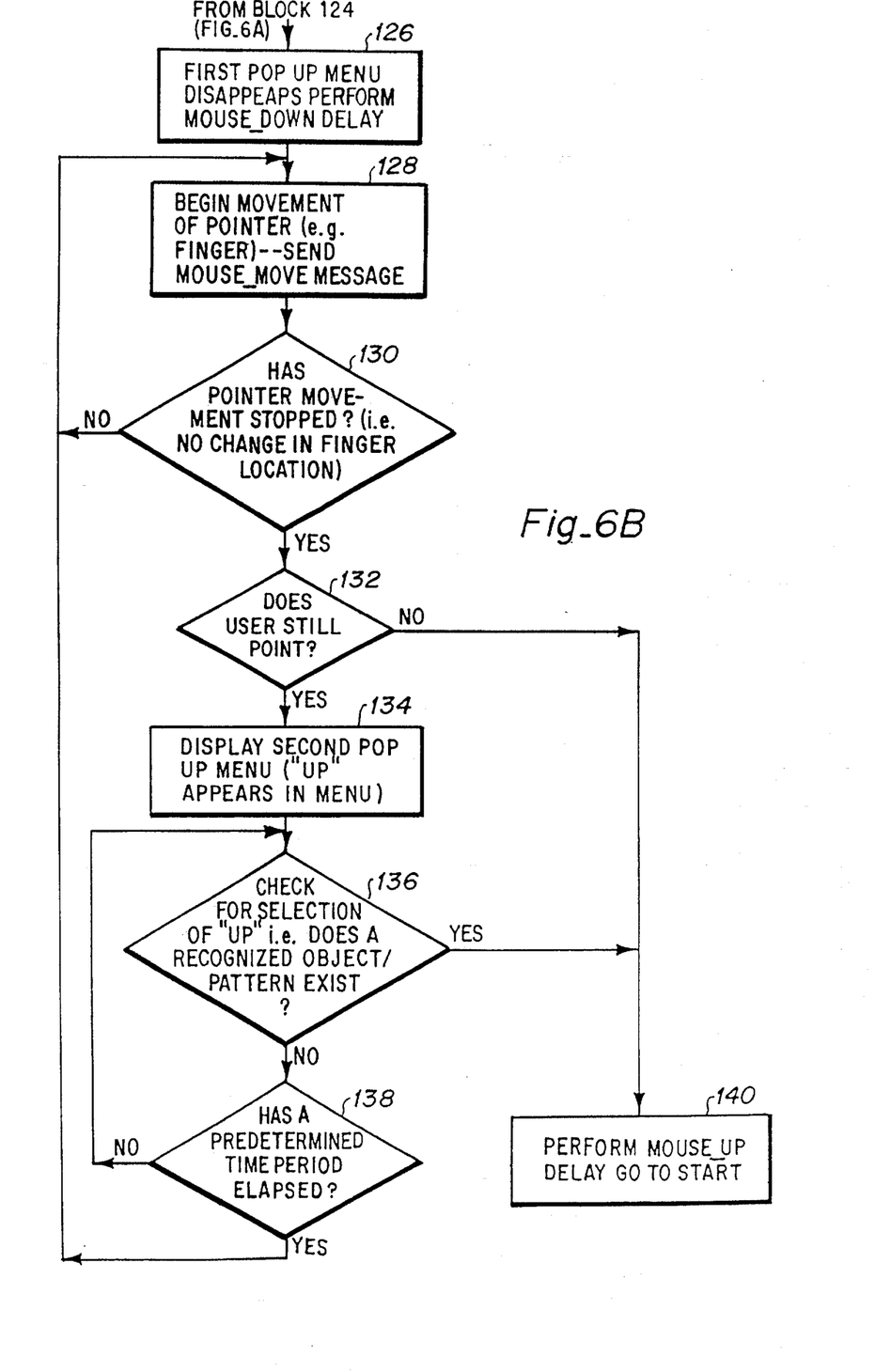

Referring now to FIG. 6b, when a user chooses the button 75 corresponding to the Down command 74, the driver response by sending a Mouse_Down message to the operating system (step 126) with the additional information of the coordinates of the point. In addition, the first pop up menu window 68 disappears and the user is given a short delay (e.g., 2 seconds) to return the pointer from the location of the button 75 to the location of the cursor 61.

Once the Mouse_Down command message has been received, the computers resumes following the movement of the user's fingers 60. During this time, a series of updated "Mouse_Move" messages are sent to the operating system along with the updated (x,y) coordinates (step 128). This process continues as long as the user changes the pointing location (steps 128–130).

The moment the user stops moving the pointer, he or she has two options (step 132). One option is to stop pointing, i.e., by withdrawing his or her finger(s) from the projected or displayed image. This will cause the driver to send to WINDOWS™ a Mouse_Up command, and then after a small delay, the program will return to the beginning (step 140).

Alternatively, if the user is still pointing to the same location, a second pop up menu window 78 (see e.g., FIG. 5b) is displayed. The second pop up menu window 78 preferably contains only the single command item Up 80 along with corresponding selection button 81. If the user selects the UP command item 80 (i.e., the user places his or her fingers 60 onto the corresponding selection button 81), then the mouse driver sends the "Mouse_Up" message to WINDOWS™, and the application (in this case, the WINDOWS™ Paintbrush program) responds accordingly (step 140). The process then returns to the start after a predetermined delay. If (at step 136) a selection is not made by the user within a predetermined period of time, e.g., 2 seconds (step 138), then the second pop up menu 78 disappears and the user may continue to move his or her finger(s) 60 along the projected or displayed image 26 as before. This will result in new "Mouse_Move" messages being sent to WINDOWS™ until the user stops finger movement after which steps 132–138 are repeated.

SELF TEST

The system may include means for performing a self test to verify the calibration of the system. For example, the system may have stored in memory, two images which are identical except that the second of the two images contains an object having a particular feature, such as a pointer, located over a button contained in the image. This button is unoccupied in the first image. Upon start up, the system projects the second image containing the pointer located over the button and compares this image to the first image. The self test mode will be successful if the computer is activated to perform the instruction associated with the button.

CALIBRATION

A calibration algorithm may also be provided to calibrate the respective X,Y axis systems of the projected image and the image captured by the camera 28a in order to maintain focus, color balance, distortion and other parameters of the projected video image. This may be done by projecting predetermined images, such as corner markings 27 (see FIG. 1), having known locations, scale dimensions and color or light intensities, and comparing the predetermined corner markings 27 to the corresponding corner markings in the captured image.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. A method of providing interaction with a projected video image comprising the steps of:

using a computer to generate a video image, the video image containing at least one predetermined region having a controlled characteristic associated therewith;

projecting the video image on any surface capable of displaying a projected image;

introducing an object over the projected image for a predetermined minimum period of time;

visually recording the projected image;

capturing an image from the visual recording of the projected image which contains the object;

comparing the captured image to the computer generated video image to detect the presence of the object in relation to the at least one controlled characteristic; and generating a control signal for actuating the computer in response to the presence of the object.

2. A method as in claim 1 wherein the at least one controlled characteristic includes a button and the image comparison step further comprises:

reading a block portion of the captured image corresponding to the location of the button; and checking the block portion for the presence of the object.

3. A method as in claim 2 wherein the step of generating a control signal further comprises:

saving at least a portion of the captured image to a memory in the computer.

4. A method as in claim 1 wherein the step of generating a control signal further comprises:

triggering a computer operation in response to the location of the object being introduced over the projected image.

5. A method as in claim 4 wherein the step of modifying the video image further comprises:

generating a cursor corresponding to the location of the object being introduced over the projected image.

6. A method as in claim 5 in which an application program, is currently running on the computer, said application program is responsive to a driver for a computer input device and wherein said method further comprises the steps of:

selectively generating pop up menu windows adjacent a cursor on the projected image in response to user positioning of an object over the projected image, said menu windows contain user selectable buttons which represent driver options associated with a computer input device for triggering the operating system of the computer to send a desired computer input control message to said application program in order to perform a desired computer operation; and selecting one of said buttons by placing an object thereover for a predetermined period of time.

7. A method as in claim 1 wherein the step of comparing the captured image to the computer generated image includes detecting a recognizable pattern created by the combination of the introduced object and the projected image.

8. A method as in claim 2 which includes the step of self testing to verify calibration of projected images with captured images, said step of self testing including the steps of:

storing a first image and a second image, said first and second stored images each having a common predetermined location associated therewith, said second stored image further including an object disposed over its respective predetermined location;

projecting said second stored image;

comparing the projected second stored image with said first stored image; and triggering a predetermined computer operation if the respective predetermined locations of said first stored image and said second projected stored image are in coalignment during comparison with each other.

9. A method of providing interaction with a displayed video image comprising the steps of:

using a computer to generate a video image, the video image containing at least one predetermined region having a controlled characteristic associated therewith;

displaying the video image;

introducing an object over the displayed image for a predetermined minimum period of time;

visually recording the displayed image;

capturing an image from the visual recording of the displayed image which contains the object;

comparing the captured image to the computer generated video image to detect the presence of the object relative to the at least one controlled characteristic; and generating a control signal for actuating the computer in response to the presence of the object.

10. A method as in claim 9 wherein the at least one controlled characteristic includes a button and the image comparison step further comprises:

reading a block portion of the captured image corresponding to the location of the button; and checking the block portion for the presence of the object.

11. A method as in claim 10 wherein the step of generating a control signal further comprises:

saving at least a portion of the captured image to a memory in the computer.

12. A method as in claim 9 wherein the step of generating a control signal further comprises:

triggering a computer operation in response to the location of the object being introduced over the displayed image.

13. A method as in claim 12 wherein the step of modifying the video image further comprises:

generating a cursor corresponding to the location of the object being introduced over the displayed image.

14. A method as in claim 13 in which an application program, is currently running on the computer, said application program is responsive to a driver for a computer input device and wherein said method further comprises the steps of:

selectively generating pop up menu windows adjacent a cursor on the displayed image in response to user positioning of an object over the displayed image, said menu windows contain user selectable buttons which represent driver options associated with a computer input device for triggering the operating system of the computer to send a desired computer input control message to said application program in order to perform a desired computer operation; and selecting one of said buttons by placing an object thereover for a predetermined period of time.

15. A method as in claim 9 wherein the step of comparing the captured image to the computer generated video image includes detecting a recognizable pattern created by the combination of the introduced object and the displayed image.

16. A method as in claim 10 which includes the step of self testing to verify calibration of displayed images with captured images, said step of self testing including the steps of:

storing a first image and a second image, said first and second stored images each having a common predetermined location associated therewith; said second stored image further including an object disposed over its respective, predetermined location;

displaying said second stored image;

comparing the displayed second stored image with said first stored image; and triggering a predetermined computer operation if the respective predetermined computer locations of said first and second stored images are in coalignment during comparison with each other.

17. An interactive projected video image display system comprising:

means for generating a video image, the video image containing at least one predetermined region having a controlled characteristic associated therewith;

means for projecting the video image onto any surface capable of displaying a projected image;

means for visually recording the projected image;

means for capturing an image from the visual recording of the projected image;

image discrimination means for comparing the captured image with the generated video image and for detecting the presence of an object introduced onto the projected image and its relation to the at least one controlled characteristic; and means responsive to said image discrimination means for triggering a computer operation image when said introduced object is detected.

18. The system according to claim 17 wherein the projection means further comprises:

a liquid crystal display; and an overhead projector.

19. The system according to claim 18 wherein:

the visual recording means comprises at least one video camera; and the image capture means comprises video frame grabber.

20. The system according to claim 17 wherein:

the visual recording means comprises at least one video camera; and the image capture means comprises video frame grabber.

21. A method of providing interaction with a projected video image comprising the steps of:

using a computer to generate a video image, the video image containing a button;

projecting the video image;

introducing an object over the projected image for a predetermined minimum period of time;

visually recording the projected image;

capturing an image from the visual recording of the projected image which contains the object;

comparing the captured image to the computer generated video image to detect the presence of the object, wherein the comparing of the capture image to the computer generated video image further includes:

reading a block portion of the captured image corresponding to the location of the button;

checking the block portion for the presence of the object;

generating a control signal for actuating the computer in response to the presence of the object; and self testing to verify calibration of projected images with captured images, and wherein the self testing further includes:

storing a first image and a second image, said first and second stored images each having a common predetermined location associated therewith, said second stored image further including an object disposed over its respective predetermined location;

projecting said second stored image;

comparing the projected second stored image with said first stored image; and triggering a predetermined computer operation in accordance with the relationship of the respective predetermined locations of said first stored image and said second projected stored image during comparison with each other.

22. A method of providing interaction with a displayed video image comprising the steps of:

using a computer to generate a video image, the video image containing a button;

displaying the video image;

introducing an object over the displayed image for a predetermined minimum period of time;

visually recording the displayed image;

capturing an image from the visual recording of the displayed image which contains the object;

comparing the captured image to the computer generated video image to detect the presence of the object; wherein the comparing of the capture image to the computer generated image further includes:

reading a block portion of the captured image corresponding to the location of the button; and checking the block portion for the presence of the object;

generating a control signal for actuating the computer in response to the presence of the object;

self testing to verify calibration of displayed images with captured images, and wherein the self testing includes:

storing a first image and a second image, said first and second stored images each having a common predetermined location associated therewith; said second stored image further including an object disposed over its respective, predetermined location;

displaying said second stored image;

comparing the displayed second stored image with said first stored image; and triggering a predetermined computer operation in accordance with the relationship of the respective predetermined computer locations of said first and second stored images during comparison with each other.

* * * * *